May 5, 1959
R. M. SHERMAN
2,884,824
TOOL FOR APPLYING A FLEXIBLE LOCKING MEMBER
TO A PIPE COUPLING OR SIMILAR DEVICE
Filed April 19, 1957
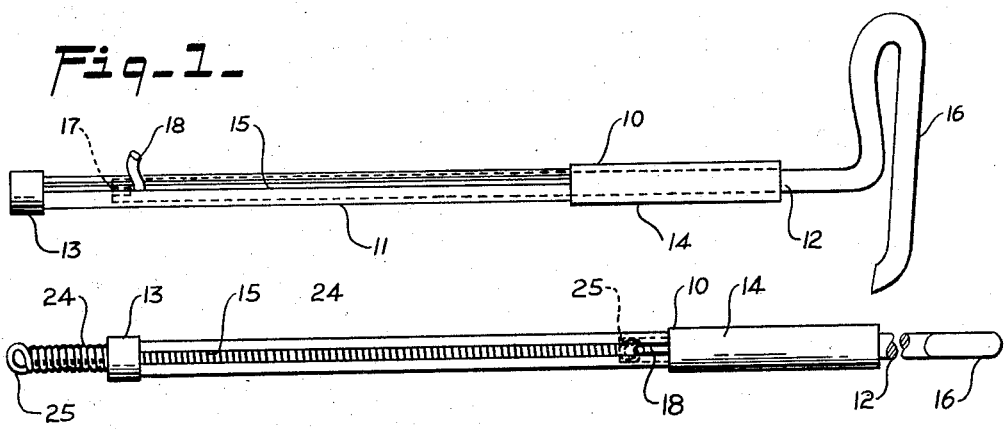
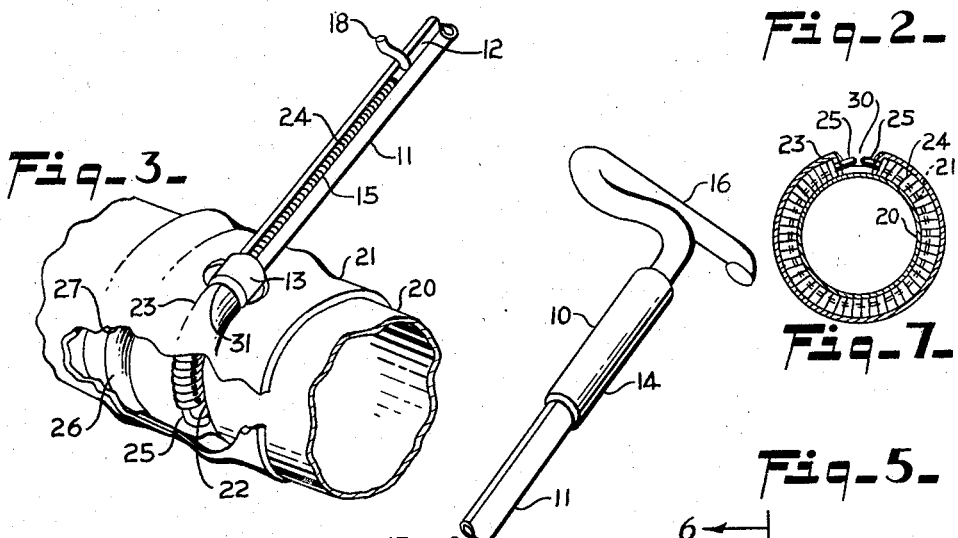
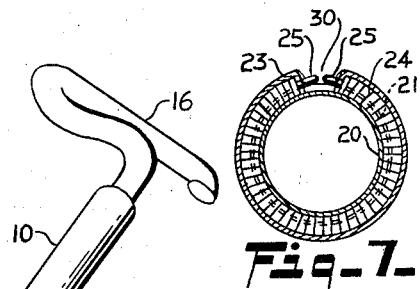
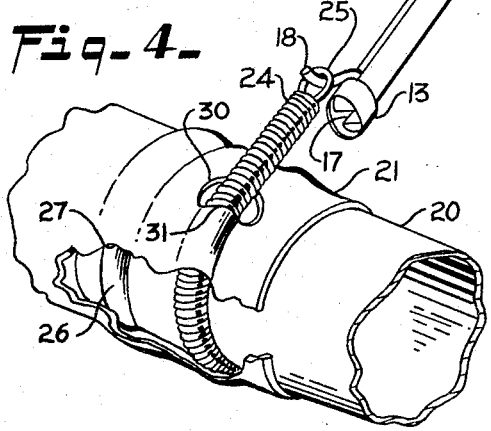
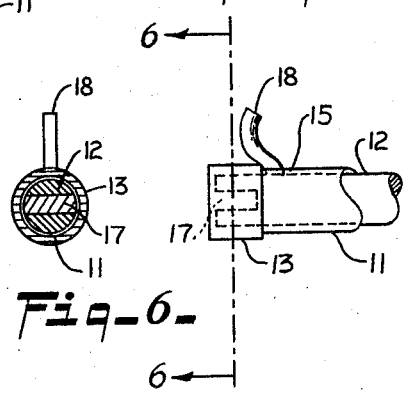
INVENTOR.
ROGER M. SHERMAN
BY *A. Dunham Cleven*
ATTORNEY

United States Patent Office 2,884,824
Patented May 5, 1959

2,884,824

TOOL FOR APPLYING A FLEXIBLE LOCKING MEMBER TO A PIPE COUPLING OR SIMILAR DEVICE

Roger M. Sherman, Palo Alto, Calif., assignor to W. R. Ames Company, San Francisco, Calif., a corporation of California Application April 19, 1957, Serial No. 653,990

4 Claims. (Cl. 81—3)

This invention relates to a tool for applying a flexible locking member to a pipe coupling or similar device.

A semipermanent coupler such as is shown in my copending application Serial No. 587,885 filed May 28, 1956, provides a type of coupling which may join strings of pipe together. Such strings could be used for an indefinite period of time, or could be unjoined at any time for storage of individual pipe sections.

Field use of this semipermanent coupling soon disclosed difficulties in installing and removing the locking member, usually a close-wound, rather stiff, linear coil spring with an eye at each end. When the spring was pushed into the coupling, it had to assume a circular shape as it followed the circular channel. Naturally, the force of friction of the spring against the channel walls and the tendency of the spring to straighten out made it increasingly difficult to install as it was pushed further in. When one pushed it in by hand, it went in pretty well for about two-thirds of the way but the final one-third required more pressure and the pressure had to be concentrated in a smaller area than one's hand could conveniently handle. The tool of the present invention solves this problem and makes installation of the flexible locking member a very simple operation.

Another problem was that the spring tended to buckle during installation. This problem is also solved by the present invention, by supporting the spring in such a manner that the column strength is greater than the friction encountered. Although the invention does not reduce the force required to insert the spring, it does enable the required force to be applied.

It will also be noted that even if the flexible locking member could be completely installed by hand, it would still take considerable time to do so. In contrast, the present invention makes it possible to install the spring in a few seconds.

There were also difficulties in the past when the time came to remove the flexible locking member. For one thing, when the pipes were used in irrigation, mud often got in the coupling and hardened around the flexible locking member, making it very difficult to pull it out. Also, the force of friction referred to earlier worked against removal. Thus, when the coupling was installed properly, it was not easily removed by hand, especially since only the small eyes at the ends of the spring were accessible.

The present invention has solved this problem by providing a tool which can be used for extraction of the locking member as well as for its insertion. With my tool, removal may be done in a simple single pull in about a second or even less.

Thus, one object of the present invention is to provide a tool for inserting a close-wound, normally linear coil spring all the way into a semipermanent type of coupling.

Another object of the invention is to support such a coil spring in a manner that prevents buckling during application of the force necessary to install it, the column strength being greater than the friction encountered.

Another object of the present invention is to provide a tool for removing a flexible locking member from a semipermanent type of coupling.

Another object of the invention is to provide a tool which greatly speeds up the coupling and uncoupling of pipe sections using a semipermanent type of coupling.

In general, the invention comprises two main pieces, one a rod-like member with a projection and the other a sleeve-like member with a closed longitudinally extending slot. The rod-like member fits slidably inside the sleeve-like member, and its projection extends out through the slot, serving both to hold the members together and to limit the relative sliding movement. In addition, the projection provides a hook that is engaged in the spring eye when uncoupling the pipe. When coupling the pipe, the flexible locking member is loaded into the sleeve, the rod being drawn out to one end of its stroke. Then with the sleeve end in contact with the pipe coupler, the rod is pushed forward and propels the flexible locking member into the locking groove of the coupler.

Other objects and advantages of the invention will appear from the following description of a preferred embodiment thereof.

In the drawings:

Fig. 1 is a view in side elevation of a tool embodying the principles of the invention, the rod being shown withdrawn a short distance from its stop at one end.

Fig. 2 is a top plan view of the tool of Fig. 1 with the rod pulled to the right and a flexible locking member inserted in the sleeve, ready for installation in the coupler. The portion of the rod projecting beyond the sleeve is broken in order to conserve space.

Fig. 3 is a fragmentary, perspective view of a portion of a pipe coupler and the lower end of the tool of Fig. 1 as it installs the flexible locking member. The female coupler has been broken away to show the leading end of the locking member.

Fig. 4 is a view similar to Fig. 3 showing the tool of the invention being used to remove the flexible locking member from the coupler. Again the female coupler has been broken away to show the locking member in its locking groove and the tool is shown broken in the middle in order to conserve space.

Fig. 5 is an enlarged view in side elevation of one end of the tool with the remaining portions broken off.

Fig. 6 is a view in end elevation and in section taken along the line 6—6 of Fig. 5.

Fig. 7 is a view in elevation and in section through the completed coupling, the spring eyes being slightly exposed.

The invention comprises a tool 10 having two principal elements, a sleeve 11 and a rod 12. The sleeve 11 is straight and preferably cylindrical and may be strengthened at its opposite ends by collar-like portions 13 and 14. A straight longitudinally extending closed slot 15 runs between the two collars 13 and 14. The length of the slot 15 may vary, depending generally on the length of the locking member 24 to be used. However, any one tool 10 is adaptable to many lengths of locking members, for the end of the locking member 14 can stick out of the sleeve 11 (compare Fig. 2), since it is the final portion of the inserting stroke that is the difficult one and which this tool 10 is principally adapted to accomplish.

The rod member 12 is preferably cylindrical with a portion at one end bent to form a handle 16, or the end may be secured to a separate handle member. The handle 16 gives a surface for the person's hand to bear against when pushing the rod 12 forward during insertion of the flexible locking member 24.

The opposite end of the rod 12 is preferably provided with a transverse slot 17 to receive and hold an end portion of a flexible locking member 24. The slot 17 shown is for use with a spring eye 25, but the slot 17 may be shaped somewhat differently to accommodate different types of ends of flexible locking members.

The rod 12 also has a male hook or projecting member 18. The member 18 may be attached to the rod 12 by threading it in, or by welding, soldering, or any other suitable means after the rod 12 is in the sleeve 11. Or it may be secured before insertion, if the slot 15 is originally made with one end open and that end collar 13 or 14 is welded in the sleeve 11 after installation of the rod 12. The hook 18 projects out through the slot 15 and accomplishes several purposes. For one thing, it guides the rod 12 in the sleeve 11 along a truly longitudinal path and prevents twisting or relative rotation. Second, the projection 18 and collars 13 and 14 cooperate to provide stops that limit the relative movement between the rod 12 and sleeve 11 at each end of the slot 15. Third, the hook member 18 is used to engage the eye 25 of the flexible coupling member 24 when pulling that member out of the coupling.

The invention will be more clearly understood by considering it in relation to its use and environment. Figs. 3 and 4 show a pair of coupler members 20 and 21, which may be formed as integral end portions of pipes or may be attached to pipes in any manner desired. The male coupler 20 has a concave male locking groove 22 in its outer surface, while the female coupler 21 has a convex locking groove 23 in its inner surface. When the couplers 20, 21 are properly aligned, the two grooves 22, 23 lie opposite each other, and it is then possible to insert a flexible locking member 24 into the space they provide.

While any of various forms of flexible locking members 24 may be used in such couplings, the form illustrated comprises a close-wound coil spring which is normally straight or longitudinal and which, by virtue of its being a coil spring, is able to conform to the circular shape provided by the grooves 22 and 23. Preferably, the coil spring 24 has an eye 25 at each end or some other type of means by which the spring 24 can be engaged when pulling it out of the coupling.

The coupling may also have an O-ring 26 held against a flat surface of the male coupler 20 and positioned in by a sealing groove 27 in the female coupler 21. The basic idea of the semipermanent coupler is that when the flexible locking member 24 is inserted through an opening 30 in the groove portion of the coupler 21, and fits in the two grooves 22 and 23, it becomes a locking ring and the pipes 20, 21 cannot be moved relatively to each other. When the locking member 24 is withdrawn, the pipes are readily slid relatively to each other.

Before insertion of the flexible locking member 24, the male coupler 20 is inserted into the female coupler 21, and the grooves 22 and 23 are aligned. Then the locking spring 24 is inserted through the opening 30. If the locking spring 24 were to be inserted by hand, it would be pushed into the coupling grooves 22 and 23, but after it had gone in about half way, the friction would make it more and more difficult to push the spring in, and by the time the ring 24 was inserted about two-thirds of its length, it would be very difficult, if not impossible, to push it the rest of the way by hand. Resort would then have to be made to a hammer or some other driving tool to push it in stroke by stroke. The present invention eliminates that kind of trouble and at the same time greatly speeds up the insertion of the spring 24.

When using the tool 10, the first step normally is to insert a major, or at least a substantial, portion of the spring 24 into the sleeve 11, the rod 12 being withdrawn (see Fig. 2) so that the projecting member 18 lies against the collar 14 as a stop. Normally this is done by first locking the eye 25 into the transverse slot 17 and then pushing the spring 24 to propel the rod 12 relative to the sleeve 11 until the stop members 18 and 14 are engaged.

The end of the spring 24 that sticks out of the sleeve 11 is then inserted into the opening 30, and the end of the sleeve 13 is brought to bear against the wall 31 of the coupling member 21 adjacent the opening 30. Using the coupler wall 31 as a bearing surface to prevent further movement of the sleeve 11, the handle 16 is pushed toward the coupler, propelling the rod 12 and forcing the flexible locking member 24 out into the grooves 22 and 23. The pushing is continued until the projecting member 18 engages the collar 13 at the end of the slot 15, and the locking member 24 is then fully installed, locking the coupling. Pushing is easy. Therefore it takes only one hand, the other hand being free to hold the female coupling member 21 and prevent relative rotation of it during insertion of the spring 24. When the projecting member 18 reaches the stop at the end of the slot 15, the transverse slot 17 lies very close to, in fact almost flush with, the end of the sleeve 11, so that the eye 25 of the flexible locking member 24 will barely project from the opening 30. (See Fig. 7.)

Withdrawal is even simpler. The male projecting member 18 is used as a hook. It is inserted through the eye 25 of the spring 24, and then, while holding the coupling 20, 21 with one hand, if desired, the other hand is used to pull the tool 10 away from the opening 30. The hook 18 carries the spring 24 with it out of the grooves 22, 23 by a simple stroke that normally takes less than a second.

It will thus be evident that the invention makes it possible to insert and withdraw the flexible locking member 24 very rapidly so that an operator can go from one coupling to the next and very quickly join a long string of pipe or disconnect the sections for moving or storage.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A tool for insertion in and removal from a coupling of a flexible locking member having an axially extending loop at one end, said tool including in combination, a rod with a handle at one end, a transverse open slot in the other end, and a male hook-like member extending outwardly from said rod near the open slot end; and a tube slidably mounted on said rod and having a closed axially extending slot through which said male member protrudes, said male member serving as a stop at either end of the closed slot, whereby said flexible locking member may be inserted into said tube with said loop locked in said open slot of said rod, and the tube end further from said handle may be held against the coupling, pressure applied, and the rod slid relative to said tube to push the flexible coupling member into its locking position.

2. A tool for inserting and removing a flexible locking member for a pipe coupling, said tool including in combination, a rod with a handle at one end and a hook-like member projecting out from near the other end; and a sleeve slidably mounted around said rod and having a closed axially extending slot extending lengthwise thereof, said hook-like member projecting out through said slot and serving as a stop at either end thereof.

3. A tool for insertion in and removal of a flexible locking member in a coupling, comprising a sleeve with a longitudinal slot closed at each end, a rod within said sleeve and having a handle at one end, and a member on said rod and projecting radially outwardly through said slot from adjacent the other end and serving as a stop at each end of said slot, so that when a said flexible locking member is inserted into said tube with the rod slid out toward its handle end, the tube end further from said handle may be held against the coupling and the handle pushed to slide the rod relative to said tube and push the flexible coupling member into said coupling.

4. A tool for joining and unjoining couplings, by means of inserting or removing a flexible locking member having an end fixture, said tool including in combination, a rod with a handle at one end and a fixture receiving opening in the other end, a hook-like member projecting outwardly from said rod opposite the handle end, and a sleeve mounted slidably on said rod and having a closed longitudinal slot through which the hook-like member projects.

References Cited in the file of this patent

FOREIGN PATENTS 946,580   Germany _____ Aug. 2, 1956